United States Patent
Genelle et al.

(10) Patent No.: US 9,559,838 B2
(45) Date of Patent: Jan. 31, 2017

(54) METHOD OF PROCESSING DATA PROTECTED AGAINST FAULT INJECTION ATTACKS AND ASSOCIATED DEVICE

(75) Inventors: Laurie Genelle, Saint Martin du Tertre (FR); Christophe Giraud, Pessac (FR); Emmanuel Prouff, Paris (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 1479 days.

(21) Appl. No.: 12/847,156

(22) Filed: Jul. 30, 2010

(65) Prior Publication Data

US 2011/0029784 A1    Feb. 3, 2011

(30) Foreign Application Priority Data

Jul. 30, 2009    (FR) .................................... 09 55371

(51) Int. Cl.
  G06F 21/00    (2013.01)
  H04L 9/06    (2006.01)
  H04L 9/00    (2006.01)
(52) U.S. Cl.
  CPC ............. H04L 9/0631 (2013.01); H04L 9/004 (2013.01)
(58) Field of Classification Search
  CPC ................................ H04L 9/0631; H04L 9/004
  (Continued)

(56) References Cited

U.S. PATENT DOCUMENTS

2001/0011959 A1* 8/2001 Hirano ..................... G06T 9/007
                                                                 341/65
2001/0031064 A1* 10/2001 Donescu ............... G06T 1/0028
                                                                 382/100

(Continued)

FOREIGN PATENT DOCUMENTS

FR    2 919 739    2/2009

OTHER PUBLICATIONS

Karpovsky M. et al., "Robust protection against fault-injection attacks on smart cards implementing the advanced encryption standard", Dependable Systems and Networks, 2004 International Conference on Florence, Italy Jun. 28-Jul. 1, 2004, Piscataway, NJ, USA, IEEE, Jun. 28, 2004 (Jun. 28, 2004), pp. 82-90, XP010710793, ISBN: 978-0/7695-2052-0.

(Continued)

*Primary Examiner* — David García Cervetti
(74) *Attorney, Agent, or Firm* — Young & Thompson (57) ABSTRACT

A method of cryptographic processing of data (X), in particular a method protected against fault injection attacks, and an associated device. The processing includes at least one transformation (100, 100₁-100₆) of an input data item (s) into a result data item (s'). In this case the method includes a step (E204) of verifying the transformation including the following steps:

- obtaining (E206) a first data item (DV(s')) that is compressed by applying a compression operation (110, MDV, ADV) to the result data item (s');
- obtaining (E208) a second compressed data item (DV(s)) that is compressed by applying the compression operation (110, MDV, ADV) to the input data item (s);
- determining (E210) a verification data item (DV(s)') by applying the transformation (100, 100₁-100₆) to the second compressed data item (DV(s)) and;
- comparing (E212) the verification data item and the first compressed data item.

18 Claims, 5 Drawing Sheets (58) Field of Classification Search
USPC .......................................................... 713/189
See application file for complete search history.

(56) References Cited

U.S. PATENT DOCUMENTS

| | | | |
|---|---|---|---|
| 2003/0023591 A1* | 1/2003 | Ma .............................. | G06F 7/02 |
| 2003/0041009 A1* | 2/2003 | Grey .................. | G06Q 30/0601 |
| | | | 705/37 |
| 2003/0078686 A1* | 4/2003 | Ma ............................ | G06F 7/02 |
| | | | 700/91 |
| 2003/0097394 A1* | 5/2003 | Chauvel ................ | G06F 9/5016 |
| | | | 718/100 |
| 2005/0076039 A1* | 4/2005 | Ludwig ................. | G11B 27/031 |
| 2006/0026210 A1* | 2/2006 | Vaszary .............. | G06F 17/3071 |
| 2007/0150499 A1* | 6/2007 | D'Souza ............. | G06F 11/1458 |
| 2007/0258650 A1* | 11/2007 | Marchal .................... | G06T 9/00 |
| | | | 382/232 |
| 2008/0140645 A1* | 6/2008 | Denoual ............. | G06F 17/2247 |
| 2008/0253557 A1* | 10/2008 | Dottax .................. | H04L 9/0631 |
| | | | 380/28 |
| 2008/0253666 A1* | 10/2008 | Le Leannec ........... | H04N 19/70 |
| | | | 382/232 |
| 2009/0034717 A1* | 2/2009 | Giraud .................... | G06F 7/723 |
| | | | 380/28 |
| 2010/0312996 A1* | 12/2010 | Aymeric ............. | G06F 11/1497 |
| | | | 712/220 |
| 2011/0055591 A1* | 3/2011 | Rivain .................... | H04L 9/003 |
| | | | 713/189 |

OTHER PUBLICATIONS

French Search Report dated Feb. 25, 2010, from corresponding French application.

* cited by examiner

METHOD OF PROCESSING DATA PROTECTED AGAINST FAULT INJECTION ATTACKS AND ASSOCIATED DEVICE

This application claims priority from French patent application No. 09 55371 of Jul. 30, 2009 which is incorporated herein by reference.

FIELD OF THE INVENTION

The present invention concerns a method of cryptographic processing of data, in particular data protected against fault-injection attacks, as well as an associated device.

BACKGROUND OF THE INVENTION

In some data processing methods, in particular in the framework of cryptographic processing of data, there is used, within the processing algorithms, data that must remain secret (such as cryptographic keys, for example) to ensure that the system operates with the required security. This type of method is then the target of attacks by malicious users who seek to thwart the security of the system.

Among these attacks, there are known attacks of the fault-injection type that consist in disturbing all or part of the normal execution of the data processing method (generally implemented by the execution of a program in a microprocessor) in order to obtain, on exit from the method, data different from that normally expected but revealing information on the secret data used in the algorithm (the contrary of what is expected in fault-free execution of the program).

Thus to fight against this type of attack complementary steps have been added (such as the reiteration of calculations already effected or calculation of the decrypted data item, for example) in order to verify fault-free execution of the data processing method, as described for example in the patent applications WO 2005/088895, WO 2006/103341 and FR 2 919 739.

In the latter patent application, a data item resulting from a first iteration of the cryptographic calculation is stored for the duration of a second iteration of the same calculation. Alternatively, a decryption calculation is performed on the data item resulting from the first iteration to recover, a priori, the initial data item.

A comparison is then effected either between the results of the two iterations or between compressed versions of the initial data item and the decrypted data item to detect any fault during the execution.

However, these solutions have a few drawbacks.

Among other things, this duplication of operations (double iteration or encryption/decryption) leads to a high overcost in calculation time that can be prejudicial for real-time processing.

Moreover, these solutions do not protect systems from fault-injection attacks effected symmetrically on the two iterations of the same calculation. Such attacks lead to identical results for the two iterations and thus to a positive comparison.

Finally, these techniques remain generic because they apply to the whole of a cryptographic algorithm, such as the DES (Data Encryption Standard) algorithm, without taking account of the transformations that constitute the algorithm.

SUMMARY OF THE INVENTION

In this context, the invention proposes in particular a method of cryptographic processing of data comprising at least one transformation of an input data item into a result data item, the method comprising a step of verifying said transformation, wherein verifying the transformation comprises the following steps:
  obtaining a first data item that is compressed by applying a compression operation to said result data item;
  obtaining a second data item that is compressed by applying a compression operation to said input data item;
  determining a verification data item by applying said transformation to said second compressed data item and;
  comparing said verification data item and said first compressed data item.

The compressed data is generally digest values produced by a hashing function.

According to the invention, the processing is verified using data digest values. The digest value of the result of the transformation is verified against the result of the transformation applied to the initial data digest value.

The resources involved in these verification calculations manipulate digest values and are therefore small: calculation time, memory space occupied.

Moreover, in a cryptographic algorithm, the method of the invention is applied transformation by transformation. It is therefore easy to adopt compression operations specific to each transformation. The error detection rate and the time necessary for this detection for each of these operations is nothing but improved.

The present invention applies in particular to AES (Advanced Encryption Standard) encryption.

As a function of the result of the comparison, it is therefore possible to detect a fault in the execution of the transformation and thus potentially a fault-injection attack on the cryptographic processing. In this case, at least one error is generated if said verification data item and said first compressed data item are different.

In one embodiment, said compression operation comprises multiplying components of the result or input data item.

The multiplicative nature of the compression operation is particularly well suited to the verification of non-linear multiplicative transformations, especially those using powers, such as for example the transformation MIT (Multiplicative Inverse Transformation) constituting the AES SubByte operation.

According to one particular feature, the compressed data item is the product of all the components of the result or input data item:

$$DV = \prod_i x_i,$$

where DV is the compressed data item, $(x_i)_i$ are the components of the result or input data item.

In particular, the components that are equal to zero are corrected so as to take the value "1" in said product, for example by adding a dirac function of the component that takes the value 1 for a zero component and 0 otherwise.

Thus it is also possible to detect faults applied to zero components or generating zero components. This improves error detection.

According to one particular feature, the verification step comprises verifying that a zero component of the result or input data item corresponds to a zero component of respectively the input or result data item.

This verifies all cases not covered by the multiplicative nature of the compression operation, in particular with a zero input or result component. Thus all errors are detected.

This verification may advantageously take place before said obtaining, determining and comparing steps to reduce the processing load by avoiding these steps if a fault has already been detected.

An example of verification for the transformation MIT (which leaves only 0 invariant) consists in using a formula (exclusive OR) summing the diracs (taking the value 1) of the input and result components two by two.

This parallel verification makes it possible to simplify the expression for and the calculation of the compression operation. In particular, zero components are excluded from said product.

In one embodiment, said compression operation on components of the result or input data item is of a multiplicative or additive nature, as a function of the linearity of said transformation. For example, a multiplicative compression operation is chosen when the transformation is a non-linear multiplication transformation and an additive compression operation is chosen if the transformation is linear.

In one embodiment of the invention, said obtaining, determining and comparing steps are duplicated with at least one second compression operation. It must be remembered that these steps operate on the digest values. Thus their duplication remains of benefit with regard to the double iteration of the prior art techniques.

This configuration makes it possible to improve the detection of faults in the case of identical multiple faults, for example faults affecting two bytes of the AES block. The second operation is in particular different from the first compression operation.

It is seen that, by virtue of this duplication, the two complementary types of digest value are used conjointly.

In particular, in one embodiment, said second compression operation is of the form $$DV = \prod_i (x_i + \delta_0(x_i))^{i+1},$$

where DV is the compressed data item, $(x_i)_i$ are the components of the result or input data item. This configuration applies for example to the AES transformation MIT.

Note here that the use of verification of the zero components as described above combined with these two compression operations makes it possible to improve significantly the detection of fault-injection attacks during the transformation MIT, and in particular those affecting two bytes of the AES block.

Alternatively, said second compression operation is additive of the form $$DV = \sum_i F_i(x_i),$$

where DV is the compressed data item, $(x_i)_i$ are the components of the result or input data item, and $(F_i)_i$ are bijective functions, used in particular for linear transformations.

In particular, in one simple embodiment, $F_i(x) = \lambda_i \cdot x$, where $(\lambda_i)_i$ are constants. In particular, the constants are non-zero and different two by two. This configuration makes it possible, for example when the first operation is also of an additive nature, to detect all faults affecting two bytes of a block for the AES SubBytes, MixColumns and AddRoundKey transformations AT.

Also, $F_i(x) = x^{3\alpha}$, where $\alpha$ is an adjustable parameter. Thus fault detection can be adjusted to suit the resources available.

In one embodiment of the invention, the cryptographic processing comprises a plurality of consecutive transformations for generating encrypted data, and the method comprising a said verification that performs a compression operation for conjointly verifying at least two of said transformations. This reduces the number of verification operations carried out and thus the processing cost for verifying the cryptographic algorithm.

In another embodiment of the invention, the cryptographic processing comprises a plurality of consecutive transformations for generating encrypted data, and the method comprises a said verification for each of a plurality of said transformations.

Thanks to the invention, each of the transformations constituting the cryptographic algorithm is specifically verified. Thanks to a specific and suitable compression operation, this specific verification makes it possible to improve the efficacy of this detection and to obtain more precise information as to the time at which the fault occurred.

In particular, for consecutive first and second transformations, said obtaining of a first compressed data item for the first transformation is after the application of the second transformation to the result data item of the first transformation and to the step of obtaining a second compressed data item for said second transformation. This makes it possible to guarantee that a fault is detected even when the fault occurs between the execution of two transformations, where each of the transformations is verified individually.

There can also be provision for using the same compression operation for at least two transformations. This reduces the memory space necessary for storing the compression operations.

According to one particular feature of the invention, the method comprises a said verification, possibly conjoint, for each of the transformations constituting said cryptographic processing. Thus all transformations constituting the cryptographic processing are verified.

In one embodiment, the cryptographic processing is symmetrical.

In particular, the cryptographic processing is at least one round of the Advanced Encryption Standard (AES). However, other cryptographic algorithms, such as the DES or FOX algorithm, may implement the present invention.

In a correlated way, the invention also concerns a device for cryptographic processing of data comprising at least one transformation of an input data item into a result data item, characterized in that it comprises:
  means for obtaining a first data item that is compressed by applying a compression operation to said result data item;
  means for obtaining a second data item that is compressed by applying the compression operation to said input data item;
  means for determining a verification data item by applying said transformation to said second compressed data item and;
  means for comparing said verification data item and said first compressed data item, so as to verify said transformation.

Such a device may be a pocket electronic entity, such as a microcircuit card, for example one conforming to the ISO7816 standard; alternatively, it may be some other type of electronic entity, such as a computer, for example (such as a personal computer) or a USB key.

The device may optionally include means relating to the features of the processing method explained above.

The methods referred to above are typically implemented by a microprocessor executing instructions of a computer program. Thus executing the instructions enables processing by the microprocessor of the data stored in the device, for example in a random-access memory thereof. Other embodiments may nevertheless be envisaged, such as for example the use of an application-specific circuit able to execute the steps of the methods referred to above.

In these various contexts, the input data may be data received by the processing device from an external device, for example by means of a communication interface of the processing device. It may nevertheless also be data stored in the device (for example in non-volatile memory) or intermediate data obtained from result data of another transformation.

Likewise, at least one of the result data items may be a data item to be sent as an output of the device, for example to the external device, by way of the communication interface. The result data may nevertheless be merely intermediate data, possibly used by the device in later processes (for example calculation processes).

Each of the cryptographic algorithms referred to above makes it possible for example to perform, at least in part, an encryption, decryption, signature, cryptographic key exchange or cryptographic key generation operation.

In this type of application, the input data is for example a message (or a part of a message) received from the external device that is encrypted (or decrypted) in the processing device by means of the aforementioned cryptographic algorithms and then retransmitted as an output by the processing device via the communication interface.

BRIEF DESCRIPTION OF THE DRAWINGS

Other features and advantages of the invention will become more apparent in the following description, illustrated by the appended drawings, in which.

DETAILED DESCRIPTION OF EMBODIMENTS OF THE INVENTION

Figure 1:
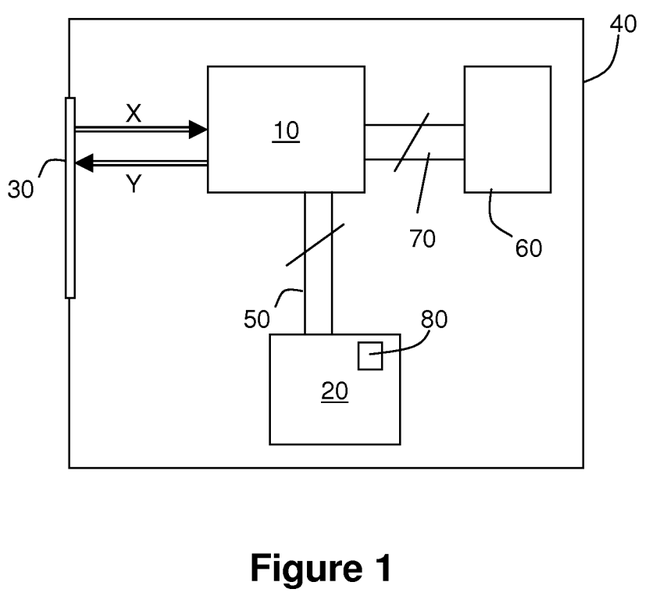
FIG. 1 represents diagrammatically the main elements of one possible embodiment of a microcircuit card.

FIG. 1 represents diagrammatically a data processing device 40 in which the present invention is implemented. This device 40 includes a microprocessor 10 associated with on the one hand a random-access memory 60, for example by means of a bus 70, and on the other hand a non-volatile memory 20 (for example of EEPROM type), for example via a bus 50.

The data processing device 40, to be precise the microprocessor 10 that it incorporates, may exchange data with external devices by means of a communication interface 30.

There is diagrammatically represented in FIG. 1 the transmission of an input data item X received from an external device (not shown) and forwarded from the communication interface 30 to the microprocessor 10. In a similar manner, there is represented the transmission of an output data item Y from the microprocessor 10 via the communication interface 30 to an external device. This output data item Y is the result of a data processing by the microprocessor 10, generally a processing on the input data item X using a secret data item 80 internal to the system, for example a private key.

Although, for purposes of illustration, the input data and the output data are shown as two different arrows, the physical means that enable communication between the microprocessor 10 and the interface 30 may be implemented as a single means, for example a serial communication port or a bus.

The microprocessor 10 is able to execute software (or a computer program) that enables the data processing device 40 to execute a method of the invention, examples of which are described hereinafter. The software is made up of a series of command instructions of the microprocessor 10 stored in the memory 20, for example.

Alternatively, the combination of the microprocessor 10, the non-volatile memory 20 and the random-access memory 60 may be replaced by an application-specific circuit which then includes means for executing the steps of the data processing method.

Figure 2:
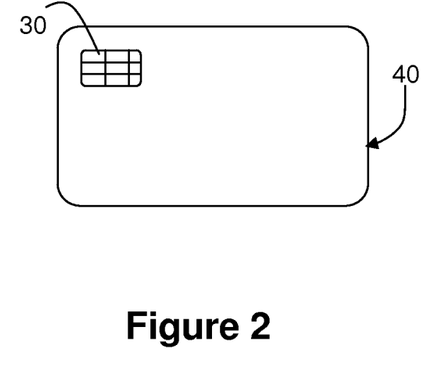
FIG. 2 represents the general physical appearance of the microcircuit card from FIG. 1.

FIG. 2 represents a microcircuit card that constitutes one example of a data processing device according to the invention as shown in FIG. 1. In this case the communication interface 30 is provided by the electrical contacts of the microcircuit card. The microcircuit card represented in FIG. 1 incorporates a microprocessor 10, a random-access memory 60 and a non-volatile memory 20.

This microcircuit card conforms to the ISO 7816 standard, for example, and is provided with a secure microcontroller that combines the microprocessor (or CPU) 20 and the random-access memory 60.

Alternatively, the data processing device may be a USB key, a document or a paper information medium including in one of its leaves a microcircuit associated with contactless communication means. It is preferably a portable or pocket electronic entity.

There is described next with reference to FIGS. 3 to 6 an example of a method of the invention applied to AES type symmetrical cryptographic processing, during which the microprocessor 10 seeks to encrypt a message X to produce an encrypted message Y.

Figure 3:
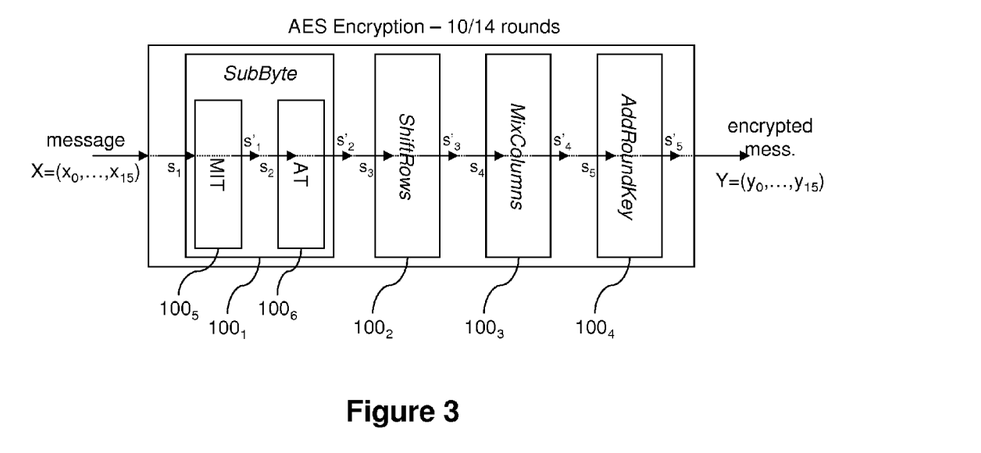
FIG. 3 illustrates diagrammatically the AES algorithm for implementing the method of the invention.

FIG. 3 illustrates diagrammatically the AES algorithm, which takes as input a block of 16 bytes of the message to be processed: $X=(x_i)_{i=0\ldots15} \in GF(2^8)^{16}$.

AES encryption executes a series of rounds, generally 10, 12 or 14 rounds, comprising the individual transformations represented in the figure.

The four main steps of a round are the non-linear bit by bit addition operation SubByte $100_1$ of substitution of each byte $x_i$ using a box S-Box, then the linear operations of cyclic transposition ShiftRows $100_2$, matrix product MixColumns $100_3$ and combination of each byte with a round key AddRoundKey $100_4$.

The order of the operations SubByte and ShiftRows may nevertheless be reversed relative to the order in the figure without impacting on the algorithm.

These steps are defined in the AES standard and consequently are not described in detail except in terms of what is of relevance to the present invention. Each step is seen as an individual transformation of the algorithm, plus the step SubByte that may be divided into two more individual transformations: a non-linear multiplicative inverse transformation (MIT) $100_5$ and a linear affine transformation (AT) $100_6$. Accordingly, S-Box($x_i$)=AT∘MIT($x_i$).

Figure 4:
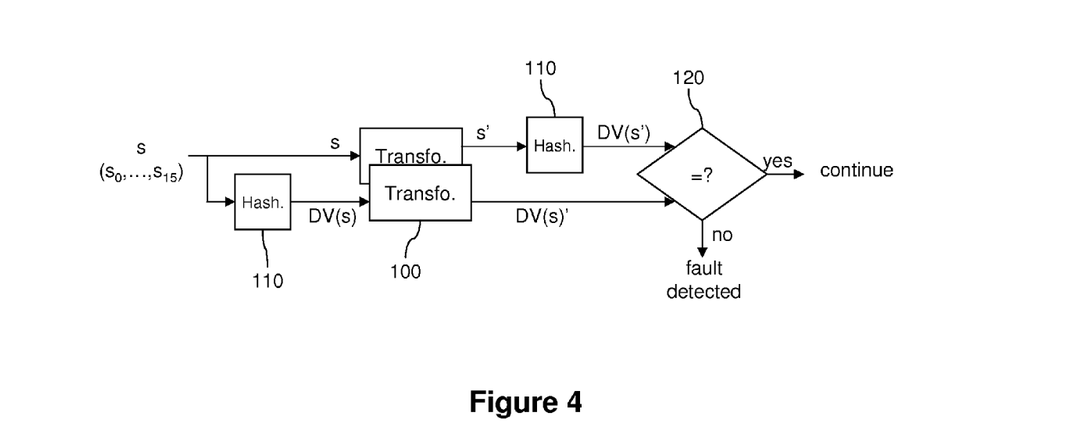
FIG. 4 represents, in diagrammatic fashion, an example of steps for verifying a transformation in accordance with the invention.

As shown in FIG. 4, each transformation $100_i$ receives an input data item s=($s_0$, . . . , $s_{15}$)∈GF $(2^8)^{16}$ and supplies, as an output, a result data item s'=($s'_0$, . . . , $s'_{15}$).

According to the invention, there is added to this transformation a verification step comprising:
  obtaining a first data item DV(s') that is compressed by applying a compression operation 110 to said result data item s';
  obtaining a second data item DV(s) that is compressed by applying the compression operation 110 to said input data item s;
  determining a verification data item DV(s)' by applying the transformation 100 to said second compressed data item DV(s); and
  comparing 120 said verification data item DV(s)' and said first compressed data item DV(s').

This comparison makes it possible either to detect a fault (equality not obtained), in which case a fault message is sent back to the software whose execution is controlling the algorithm, or to confirm that the calculations of the transformation have proceeded correctly.

Figure 5:
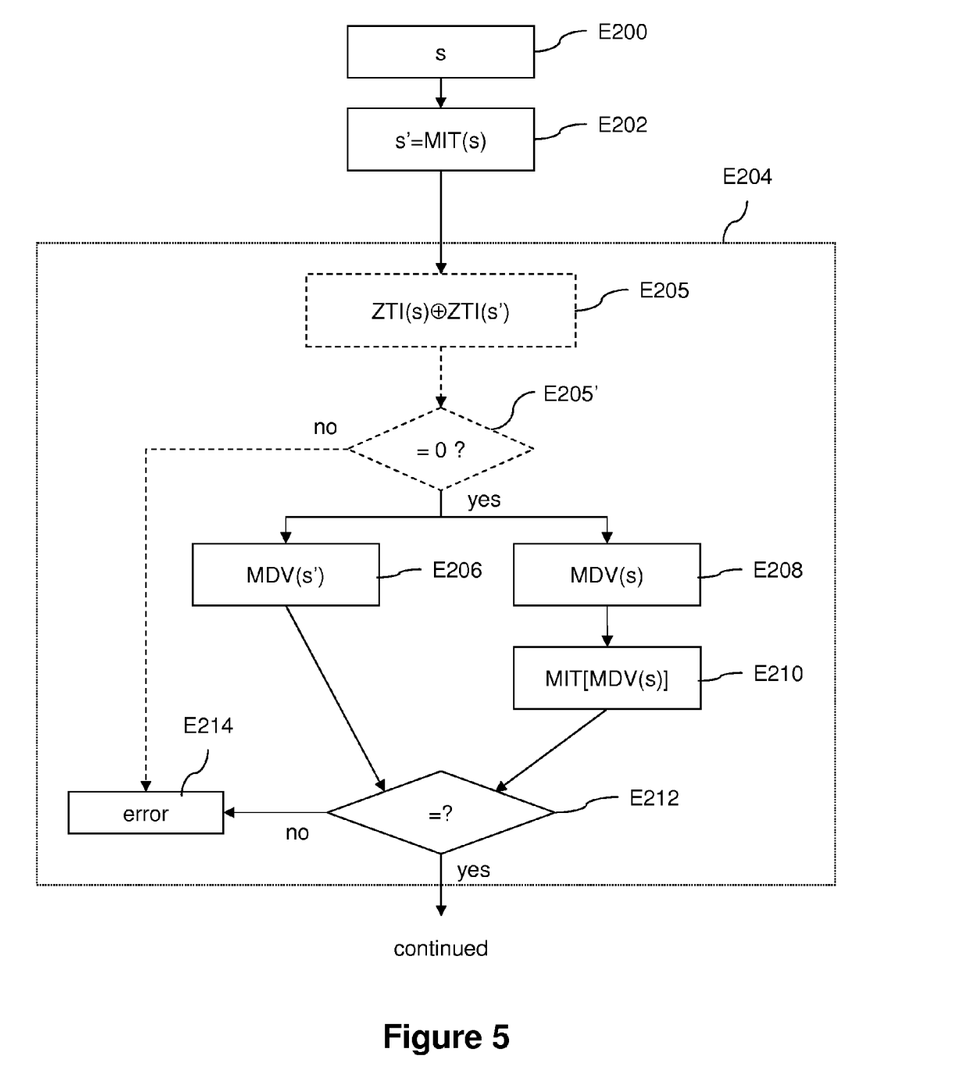
FIG. 5 represents, in flowchart form, a first example of steps for verifying the transformation MIT from FIG. 3.

There is shown next, with the aid of FIG. 5, the verification of a transformation of the invention with reference to the transformation MIT $100_5$.

In the step E200, the input data item s is available.

In the step E202, the transformation MIT is applied to this input data item to obtain the result data item s'. These steps are identical to the prior art.

The step E204 consists in verification according to the invention.

In detail, each step comprises firstly a step E206 during which a compressed data item, also referred to as a hash or digest value, is calculated from the result data item using a hashing function 110.

The transformation MIT being multiplicative and non-linear for binary addition, a hashing function 110 is adopted that is also multiplicative. In a simple first example, this function, denoted MDV (Multiplicative Digest Value), has the value:

$$MDV(x) = \prod_{i=0}^{15} x_i,$$

where $x_i$ are the sixteen components of x.

The step E206 thus calculates MDV(s').

In the step E208, MDV(s) is calculated using the same hashing function 110, after which the transformation MIT is applied in the step E210 to this result to obtain MIT(MDV(s)).

Because MIT is the inverse transformation:

$$x \to \begin{cases} 0 & \text{if } x = 0 \\ x^{-1} & \text{otherwise,} \end{cases}$$

the two values calculated in the steps E206 and E210 must be equal in the absence of disturbances when calculating the transformation E202. Thus in the step E212 these two values are compared.

If they are not equal, the processing software sends (E214) an error message to the user. Otherwise, the processing continues with the next transformation, here AT, for which the input data item is the output data item "s'" of the transformation MIT.

This simple function offers a probability of detection of a single error that is reasonable given the simplicity of implementation. However, errors or faults of the setting a value to zero or changing from 0 to a non-zero value type are not detected.

In order to improve this probability and therefore the efficacy of detection, the invention proposes the modified function:

$$MDV_1(x) = \prod_{i=0}^{15} (x_i + \delta_0(x_i)),$$

in which $\delta_0(x)$ is a dirac having the value 1 if x=0 and 0 otherwise.

This modified function $MDV_1$ makes it possible to avoid having zero terms in the product. This improves the detection of faults in situations in which some components are zero components, either the input data item s or the result data item s'. The detection probability is thus improved.

Referring again to FIG. 5, in particular to the dashed line blocks, an improved version of the verification step E204 comprises a first step E205, before the steps E206 to E212, which verifies that there is a correspondence between a zero input component $s_i$ and a zero output component $s'_i$. This is because the function MIT has the neutral element 0 as the invariant element. This makes it easy to detect setting a value to zero or changing from 0 to a non-zero value.

This preliminary verification E205 is conducted by the following calculation, in which $\delta_0(x)$ is the dirac defined above:

$$ZTI(s) \oplus ZTI(s') = \sum_{i=0}^{15} 2^i \delta_0(s_i) \oplus \sum_{i=0}^{15} 2^i \delta_0(s'_i).$$

The step E205' then verifies that the result of this calculation is a zero result, which is the case only if, for each index i, $s_i$ and $s'_i$ are either both zero or both non-zero.

In the case of a non-zero result, an error message is sent in the step E214. Otherwise the process continues with the step E206.

These steps E205, E205' thus make it possible to verify that no disturbance or error has occurred during the MIT calculations on or toward a zero coordinate.

Combined with the steps E206 et seq., this verification makes it possible to detect all errors in a single byte (one component) of the AES block.

In particular, in this case, the hashing function MDV may be simplified because the zero terms are no longer to be taken into account (they are taken into account in the verification step E205): for example, $$MDV_2(x) = \prod_{i, x_i \neq 0} x_i$$

where zero terms are excluded. Note that if the comparison step E205' is verified, it is the terms with the same indices that are excluded in this product during the steps E206 and E208.

The steps E205 and E205' are preferably executed before the steps E206-E212 in order to avoid executing the latter steps if an error has already been detected at the zero component level. The steps E205/E205' may nevertheless be executed independently, in parallel and/or afterwards.

Figure 6:
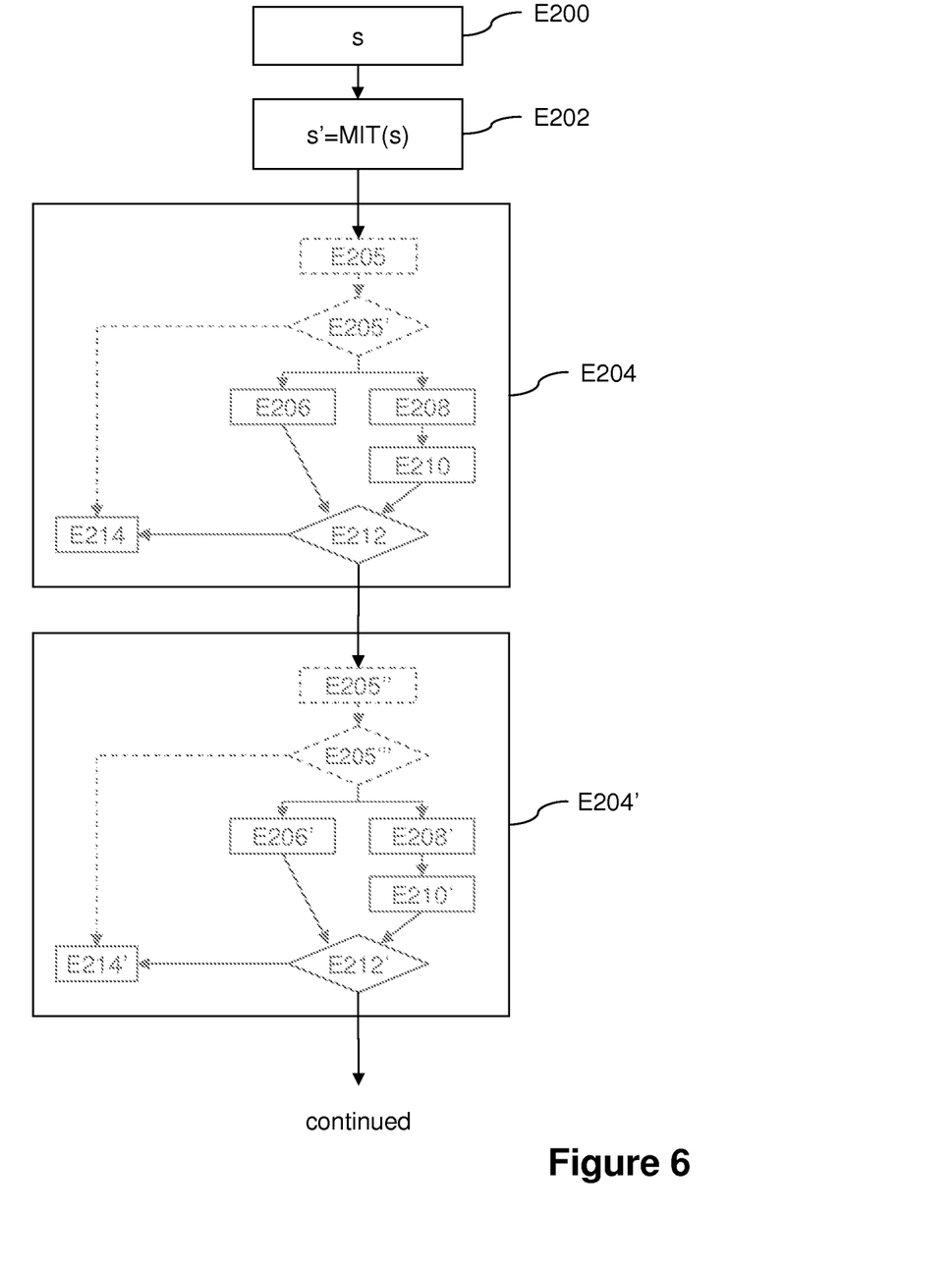
FIG. 6 represents, in flowchart form, a second example of steps for verifying the transformation MIT from FIG. 3, mainly for detecting multiple faults that affect the transformation.

FIG. 6 illustrates an example of verification of the transformation MIT to combat multiple fault injection attacks affecting in particular two bytes/components in the same processed AES block. Note, however, that the FIG. 5 example may be used in such a case with a lower detection probability.

In this example, the steps E202 to E204 are similar to those of FIG. 5, for example using the hashing function $MDV_1$ or $MDV_2$ defined above.

The verification step E204 continues with duplication E204' of the steps E206 to E212, using another (second) hashing function. However, the step E204' may be executed in parallel with the step E204 if the hardware resources of the processing device allow it.

An example of the second hashing function is:

$$MDV_3(x) = \prod_{i=0}^{15} (x_i + \delta_0(x_i))^{i+1}.$$

The conjoint use of $MDV_1$ (step E204) and $MDV_3$ (step E204') makes it possible to detect a fault in two bytes of the processed AES block (input or result components).

To improve the detection of errors in two bytes, in particular where zero components are concerned, the steps E205, E205' are executed in each of the blocks E204 and E204'. In this case, $MDV_2$ may be used with a simplified version of $MDV_3$ defined by $$\prod_{i, x_i \neq 0} x_i^{i+1}.$$

In this case, all faults are detected.

The inventors have noted that this conjoint use of $MDV_1$ (or $MDV_2$) and $MDV_3$ also makes it possible to detect faults if one fault is injected during the transformation under surveillance and another fault is injected during the calculations of digest values or compressed data.

By way of illustration, there are described next hashing functions used for verification of the other transformations $100_2$ (ShiftRows), $100_3$ (MixColumns), $100_4$ (AddRoundKey) and $100_6$ (AT).

The affine transformation $100_6$ is defined by AT: $s_i \rightarrow A \cdot s_i + c$, where c is a constant in $GF(2^8)$ and A is a matrix that can be inverted, also in $GF(2^8)$. Note that, in $GF(2^8)$, $AT(s_1 + s_2) = AT(s_1) + AT(s_2) + c$.

Because of the linear nature of AT, an additive hashing function, for example $$ADV(x) = \sum_{i=0}^{15} x_i,$$

is used for the execution of steps similar to steps E206 and E208.

The comparison between the two values $$\sum_{i=0}^{15} s_i \text{ and } \sum_{i=0}^{15} s'_i$$

obtained in these steps makes it possible to detect an error (negative comparison) or to continue (positive comparison). In particular, the following condition is verified:

$$ADV(s') = AT(ADV(s)) + c.$$

In the case of the transformation AT and the hashing function ADV, the invention makes it possible to detect efficiently all single errors resulting from fault injection attacks.

In order to enable the detection of faults in two bytes/components during processing of the same AES block, the verification step E204 is duplicated in a similar way to that described above.

A possible example of a second hashing function is:

$$ADV_1(x) = \sum_{i=0}^{15} F_i(x_i),$$

where $F_i$ is a bijective function specific to each component.

There are in particular functions $(F_j)_i$ chosen such that $F_j(x_i) \neq F_k(x_i)$ for any $j \neq k \in \{0 \ldots 15\}$ and $x_i \in 2^8$, i.e. they do not intersect at a point having an abscissa in $2^8$.

In particular, for a simple embodiment there is chosen $$ADV_1(x) = \sum_{i=0}^{15} \lambda_i \cdot x_i,$$

in which $\lambda_i$ are constants specific to each component. The constants $\lambda_i$ are chosen to be different two by two to guarantee detection of all faults. Furthermore, these constants are chosen to be non-zero in order to detect all faults in the calculation of the digest value $ADV_1$.

Thus the inventors have noted that this conjoint use of ADV and $ADV_1$ also makes it possible to detect errors if one fault is injected during the transformation AT and another fault is injected during calculation of compressed data or digest values.

The transformation ShiftRows $100_2$ causes cyclic switching of the bytes in each row of a 4×4 matrix storing the processed AES block.

As this transformation does not modify the result of commutative operations on each row of the 4×4 matrix, hashing functions of additive type ADV and multiplicative type MDV may be used alternately.

For example, to detect isolated faults (faults in one byte only), there is adopted the function $$ADV(x) = \sum_{i=0}^{15} x_i,$$

i.e. the same function used to verify the preceding transformation AT.

Thus the invention verifies that $$\sum_{i=0}^{15} s_i = \sum_{i=0}^{15} s'_i.$$

To detect multiple faults during the transformation ShiftRows, for example in two bytes/components, there is used $F_i(x) = x^{3\alpha}$, in which $\alpha$ is an adjustable positive integer. Accordingly, $$ADV_1(x) = \sum_{i=0}^{15} x_i^{3\alpha}.$$

The choice of $\alpha$ represents a compromise between the probability of detecting faults and the complexity of the calculations (in which calculations large numbers have to be manipulated). The table below lists various theoretical probabilities of detecting multiple faults as a function of the value of $\alpha$ when ADV and $ADV_1$ are used conjointly.

TABLE 1

| Detection probability as a function of $\alpha$ | |
|---|---|
| $\alpha$ | Detection probability |
| 1 | 32639/32640 |
| 3 | 32639/32640 |
| 5 | $1 - \dfrac{167424}{255^2 \cdot 256^2} \approx \dfrac{25452}{25453}$ |
| 7 | $1 - \dfrac{179520}{255^2 \cdot 256^2} \approx \dfrac{23737}{23738}$ |

It has furthermore been found that if one fault is injected during the calculation of the transformation (E202) and another fault is injected during the calculation of the digest values (E206, E208), the combination of ADV and $ADV_1$ makes it possible to detect all faults in the verification of the transformation ShiftRows if it is the calculation of $ADV_1$ that is corrupted.

A third hashing function may be provided for a third iteration of the steps E206-E212. This third iteration, denoted E204", in combination with E204 (i.e. ADV) and E204' (i.e. $ADV_1$), makes it possible to detect multiple faults affecting three components/bytes of the AES block.

An example of a third hashing function is $$ADV_2(x) = \sum_{i=0}^{15} x_i^5.$$

In this case (triple verification with ADV, $ADV_1$ and $ADV_2$), the theoretical probability of detection is $$1 - \frac{166072320}{255^3 \cdot 256^3} \approx \frac{88780747}{88780800}.$$

As far as the transformation MixColumns $100_3$ is concerned, which performs a matrix multiplication of each column of the 4×4 matrix resulting from ShiftRows, an additive type hashing function is chosen, for example $$ADV(x) = \sum_{i=0}^{15} x_i,$$

i.e. the same function as was used for verifying the preceding transformations AT and ShiftRows.

Using this function makes it possible to detect all single faults in an AES block.

To combat multiple faults, in particular two erroneous bytes, this function ADV is used conjointly with a second additive function $ADV_1$ of the type defined above:

$$ADV_1(x) = \sum_{i=0}^{15} \lambda_i \cdot x_i.$$

The constants $\lambda_i$ are in particular chosen to be non-zero and different two by two to guarantee the detection of all faults.

It has been found that this conjoint use is efficient for the detection of multiple faults affecting three bytes/components. In this case, the theoretical detection probability is $$1 - \frac{1}{255^2}.$$

Finally, as far as the transformation AddRoundKey $100_4$ is concerned, it is also possible to use the hashing function $$ADV(x) = \sum_{i=0}^{15} x_i$$

either alone to detect single faults or in combination with the function $$ADV_1(x) = \sum_{i=0}^{15} \lambda_1 \cdot x_i$$

to detect multiple faults, in particular faults affecting two bytes.

Thus the present invention makes it possible to verify individually each of the transformations constituting a cryptographic algorithm. A better diagnostic is therefore provided for the time at which any fault injection attack took place.

Furthermore, the invention reduces the calculations effected compared to the prior art solutions because it avoids the reiteration of all of the cryptographic calculations and is limited to the manipulation of digest values.

Thus protection of the transformations and the encryption algorithm is obtained.

Figure 7:
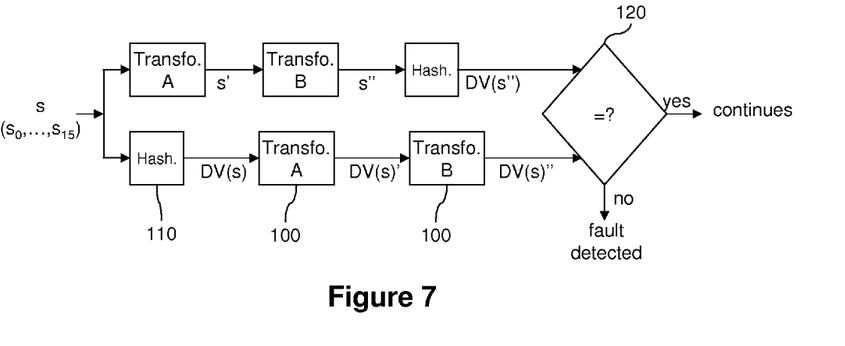
FIG. 7 represents, in diagrammatic manner, an example of steps for the combined verification of a plurality of transformations in accordance with the invention.

In an embodiment illustrated by FIG. 7, there may be provision for applying a single compression function to perform the common verification of a plurality of successive transformations. By way of illustration only, a single compression function, for example $$ADV(x) = \sum_{i=0}^{15} x_i,$$

may be used to verify two or three consecutive transformations among ShiftRows, MixColumns, AddRoundKey transformations.

This grouping strategy makes it possible to verify all the transformations constituting the general cryptographic processing at reduced cost by avoiding recourse to a compression operation (and thus a verification operation) specific to each of the transformations.

Figure 8:
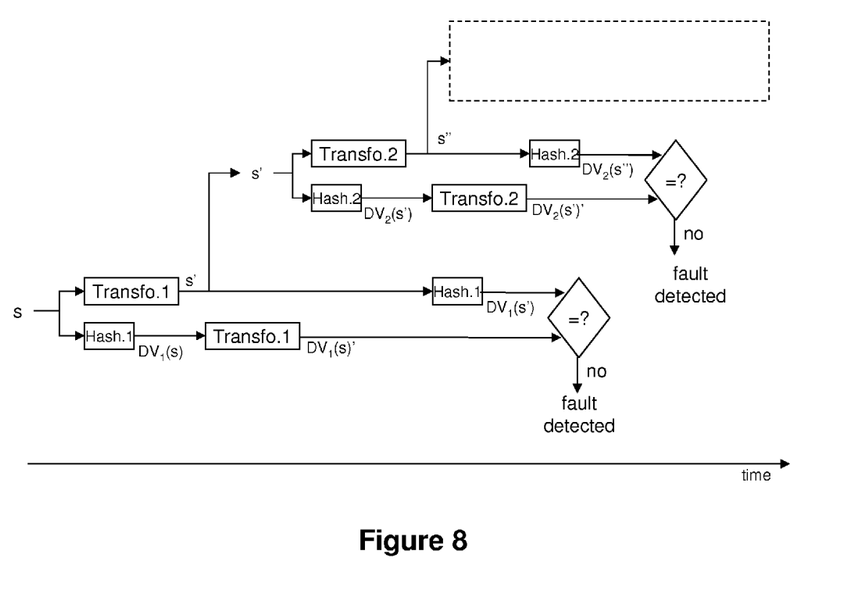
FIG. 8 illustrates, in diagrammatic fashion, an arrangement of the verification operations for two successive transformations.

FIG. 8 illustrates an embodiment of the invention in which two verifications are performed successively, each on one or more transformations. For conciseness, the figure represents, as a function of time, verification of only one transformation each time (respectively transformation 1 and transformation 2).

The result s' of the first transformation is used as input to the second transformation. This applies recursively to subsequent transformations (see dashed-line frame).

In this embodiment, applying the compression operation Hash.1 to the result s' of the first transformation (to calculate $DV_1(s')$ with a view to verifying the latter) is effected after said result s' is processed by the second transformation. This processing includes application of the second transformation Transfo.2 to the value s' to determine the result s'' to be supplied to subsequent transformations (dashed-line frame) and the calculation of the compression operation Hash.2 with a view to verifying the second transformation (calculation of $DV_2(s')$).

By respecting this order for these three operations Transfo.2, Hash.2 and Hash.1 (the order of other operations is of little importance), it is certain that the system and the method of the invention are resistant to attacks on the RAM storing the values s, s', s'', etc. or on operations of reading this RAM between actual application of two consecutive transformations.

This is because, since each operation Transfo.2, Hash.2 and Hash.1 accesses the memory to recover s', the above order makes it possible to avoid the scenario in which the first verification is declared valid by calculating $DV_1(s')$, the value s' is modified by an attack, and the second transformation is then performed on this modified value s', the corresponding verification declaring it valid by calculating $DV_2(s')$.

The foregoing examples are merely embodiments of the invention, which is not limited to them.

Although in the above description a verification is performed for each of the transformations $100_2$ to $100_6$, there may be provision for carrying out such verifications for only some of those transformations.

Furthermore, the verifications of the transformations MIT $100_5$ and AT $100_6$ may be combined into a single verification relating to the transformation SubByte $100_1$.

Also, the invention does not apply only to encryption processing as described above. Each of the transformations constituting the AES decryption processing may be verified, for example.

Moreover, the present invention is not limited to transformations of the AES symmetrical cryptographic algorithm, but may be applied to any type of algorithm, including the DES and IDEA NXT (also known as FOX) algorithms.

In a manner similar to AES, FOX performs a plurality of rounds of operations, including a non-linear operation muX and a linear operation sigmaX.

By analogy, the operation sigmaX is similar to the transformation MixColumns. Thus the additive hashing functions ADV described above may be utilized in a similar manner.

Also, the operation muX is divided into binary additions for which a verification based on additive hashing functions ADV and non-linear functions may be performed. To protect the latter functions, there may then be used the hashing functions provided for the AES S-Box, i.e. verification of the transformations MIT and AT.

The invention claimed is:

1. A method, carried out by a processor device, of cryptographic processing of data (X) that includes at least one transformation (100, 100$_1$-100$_6$) of an input data item (s) into a result data item (s'), the method comprising:
a step (E204) of verifying said transformation, said verifying step comprising the following steps:
obtaining (E206) a first data item (DV(s')) by means of executing, via the processor device, a compression operation (110, MDV, ADV) upon said result data item (s') stored in a memory device in communication with the processor device, and storing said first data item (DV(s')) in the memory device;
obtaining (E208) a second data item (DV(s)) by means of executing, via the processor device, the compression operation (110, MDV, ADV) upon said input data item (s) stored in the memory device in communication with the processor device, and storing said second data item (DV(s)) in the memory device;
generating (E210) a verification data item (DV(s)') by executing, at the processor, said transformation (100, 1001-1006) upon said second compressed data item (DV(s)), and storing said verification data item;
comparing (E212), at the processor, said verification data item and said first data item, and storing in the memory a result of the comparison; and
responsive to the storing of the result of the comparison where the result indicates a non-equality between the verification data item and said first data item, generating, at the processor, a fault message and causing software to operate upon the fault message to determine existence of a fault injection attack,
wherein said compression operation (110) comprises multiplying (MDV) components ($s_i$, $s'_i$) of the result data item (s'), and
wherein the verification step (E204) comprises verifying (E205, E205') that a zero component of the result data item (s') or input data item (s) corresponds to a zero component of respectively the input data item (s) or result data item (s').

2. The method according to claim 1, wherein at least one error is generated (Ex214) if said verification data item and said first compressed data item are different.

3. The method according to claim 1, wherein said obtaining, determining and comprising steps are duplicated (E204') with at least one second compression operation (MDV$_3$, ADV$_1$).

4. The method according to claim 1, wherein the cryptographic processing comprises a plurality of consecutive transformations ($100_1$-$100_6$) for generating encrypted data (Y), and the method comprising a said verification (E204) that performs a compression operation for conjointly verifying at least two of said transformations.

5. The method according to claim 4, comprising a said verification step (E204), possibly conjoint, for each of the transformations constituting said cryptographic processing.

6. The method according to claim 1, wherein the cryptographic processing comprises a plurality of consecutive transformations ($100_1$-$100_6$) for generating encrypted data (Y), and the method comprises a said verification (E204) for each of a plurality of said transformations.

7. The method according to claim 6, wherein, for consecutive first and second transformations, said obtaining (E206) of a first compressed data item ($DV_1$(s')) for the first transformation (Transfo.1) is after the application of the second transformation (Transfo.2) to the result data item (s') of the first transformation and to the step (E208) of obtaining a second compressed data item ($DV_2$(s')) for said second transformation.

8. The method according to claim 7, comprising a said verification step (E204), possibly conjoint, for each of the transformations constituting said cryptographic processing.

9. The method according to claim 6, comprising a said verification step (E204), possibly conjoint, for each of the transformations constituting said cryptographic processing.

10. The method according to claim 1, wherein the cryptographic processing is of symmetrical type.

11. The method according to claim 10, wherein the cryptographic processing is at least one round of the Advanced Encryption Standard (AES).

12. A method, carried out by a processor device, of cryptographic processing of data (X) that includes at least one transformation (100, $100_1$-$100_6$) of an input data item (s) into a result data item (s'), the method comprising:
  a step (E204) of verifying said transformation, said verifying step comprising the following steps:
    obtaining (E206) a first data item (DV(s')) by means of executing, via the processor device, a compression operation (110, MDV, ADV) upon said result data item (s') stored in a memory device in communication with the processor device, and storing said first data item (DV(s')) in the memory device;
    obtaining (E208) a second data item (DV(s)) by means of executing, via the processor device, the compression operation (110, MDV, ADV) upon said input data item (s) stored in the memory device in communication with the processor device, and storing said second data item (DV(s)) in the memory device;
    generating (E210) a verification data item (DV(s)') by executing, at the processor, said transformation (100, 1001-1006) upon said second compressed data item (DV(s)), and storing said verification data item;
    comparing (E212), at the processor, said verification data item and said first compressed data item, and storing in the memory a result of said comparison; and
    responsive to the storing of the result of the comparison where the result is negative, indicating a non-equality between the verification data item and said first data item, generating, at the processor, a fault message and causing software to operate upon the fault message to determine existence of a fault injection attack, wherein said compression operation (110) comprises multiplying (MDV) components ($s_i$, $s'_i$) of the result data item (s') or input data item (s), and
wherein the compressed data item (DV(s), DV(s)') is the product of all the components of the result data item (s') or input data item (s):

$$DV = \prod_i x_i,$$

where
  DV is the compressed data item,
  (xi)i are the components of the result or input data item, and
  the components (xi)i that are equal to zero are corrected so as to take the value "1" in said product, and
wherein the verification step (E204) comprises verifying (E205, E205') that a zero component of the result data item (s') or input data item (s) corresponds to a zero component of respectively the input data item (s) or result data item (s').

13. A method, carried out by a processor device, of cryptographic processing of data (X) that includes at least one transformation (100, $100_1$-$100_6$) of an input data item (s) into a result data item (s'), the method comprising:
  a step (E204) of verifying said transformation, said verifying step comprising the following steps:
    obtaining (E206) a first data item (DV(s')) by means of executing, via the processor device, a compression operation (110, MDV, ADV) upon said result data item (s') stored in a memory device in communication with the processor device, and storing said first data item (DV(s')) in the memory device;
    obtaining (E208) a second data item (DV(s)) by means of executing, via the processor device, the compression operation (110, MDV, ADV) upon said input data item (s) stored in the memory device in communication with the processor device, and storing said second data item (DV(s)) in the memory device;
    generating (E210) a verification data item (DV(s)') by executing, at the processor, said transformation (100, 1001-1006) upon said second compressed data item (DV(s)), and storing said verification data item;
    comparing (E212), at the processor, said verification data item and said first compressed data item, and storing in the memory a result of said comparison; and
    responsive to the storing of the result of the comparison where the result indicates a non-equality between the verification data item and said first data item, generating, at the processor, a fault message and causing software to operate upon the fault message to determine existence of a fault injection attack,
  wherein said obtaining, determining and comprising steps are duplicated (E204') with at least one second compression operation ($MDV_3$, $ADV_1$),
  wherein said second compression operation ($MDV_3$) is of the form $$DV = \prod_i (x_i + \delta_0(x_i))^{i+1},$$

where DV is the compressed data item, $(x_i)_i$ are the components of the result data item (s') or input data item (s),
   wherein said compression operation (110) comprises multiplying (MDV) components ($s_i$, $s'_i$) of the result data item (s'), and
   wherein the verification step (E204) comprises verifying (E205, E205') that a zero component of the result data item (s') or input data item (s) corresponds to a zero component of respectively the input data item (s) or result data item (s').

14. A method, carried out by a processor device, of cryptographic processing of data (X) that includes at least one transformation (100, $100_1$-$100_6$) of an input data item (s) into a result data item (s'), the method comprising:
   a step (E204) of verifying said transformation, said verifying step comprising the following steps:
      obtaining (E206) a first data item (DV(s')) by means of executing, via the processor device, a compression operation (110, MDV, ADV) upon said result data item (s') stored in a memory device in communication with the processor device, and storing said first data item (DV(s')) in the memory device;
      obtaining (E208) a second data item (DV(s)) by means of executing, via the processor device, the compression operation (110, MDV, ADV) upon said input data item (s) stored in the memory device in communication with the processor device, and storing said second data item (DV(s)) in the memory device;
      generating (E210) a verification data item (DV(s)') by executing, at the processor, said transformation (100, 1001-1006) upon said second compressed data item (DV(s)), and storing said verification data item;
      comparing (E212), at the processor, said verification data item and said first data item, and storing in the memory a result of said comparison; and
      responsive to the storing of the result of the comparison where the result indicates a non-equality between the verification data item and said first data item, generating, at the processor, a fault message and causing software to operate upon the fault message to determine existence of a fault injection attack,
   wherein said obtaining, determining and comprising steps are duplicated (E204') with at least one second compression operation ($MDV_3$, $ADV_1$), and
   wherein said second compression operation ($ADV_1$) is additive of the form $$DV = \sum_i F_i(x_i),$$

where DV is the compressed data item, $(x_i)_i$ are the components of the result data item (s') or input data item (s), and $(F_i)_i$ are bijective functions
   wherein said compression operation (110) comprises multiplying (MDV) components ($s_i$, $s'_i$) of the result data item (s'), and
   wherein the verification step (E204) comprises verifying (E205, E205') that a zero component of the result data item (s') or input data item (s) corresponds to a zero component of respectively the input data item (s) or result data item (s').

15. The method according to claim 14, wherein $F_i(x) = \lambda_i \cdot x$, where $(\lambda_i)_i$ are non-zero constants and different two by two.

16. A device for cryptographic processing of data (X) comprising at least one transformation (100, $100_1$-$100_6$) of an input data item (s) into a result data item (s'), comprising:
   means for obtaining a first data item (DV(s')) that is compressed by applying a compression operation (110, MDV, ADV) to said result data item (s');
   means for obtaining a second data item (DV(s)) that is compressed by applying the compression operation (110, MDV, ADV) to said input data item (s);
   means for determining a verification data item (DV(s)') by applying said transformation (100, $100_1$-$100_6$) to said second compressed data item (DV(s)) and;
   means (120) for comparing said verification data item and said first compressed data item.

17. The device according to claim 16, wherein the device is a pocket electronic entity.

18. A method, carried out by a processor device, of cryptographic processing of data (X) comprising:
   receiving, at a processor, an input data item (s);
   subjecting, by the processor, the input data item (s) to a first process including:
      transforming (100, 1001-1006) the input data item (s) into a result data item (s') and storing said result data item (s') in a memory in communication with said processor device, and
      obtaining (E206), by means of executing, via the processor device, a compression operation (110, MDV, ADV) upon said result data item (s'), a first data item (DV(s'));
   subjecting, by the processor, the input data item (s) to a second process including:
      obtaining (E208), by means of executing, via the processor device, a second data item (DV(s)) that is compressed by applying the compression operation (110, MDV, ADV) to said input data item (s) stored in the memory device in communication with the processor device, and storing said second data item (DV(s)) in the memory device, and
      executing, at the processor, a transforming operation (100, 1001-1006) upon said second data item (DV(s)) to form and store in the memory a verification data item (DV(s)');
   comparing, by the processor, (E212) said verification data item and said first compressed data item, and storing in the memory a result of said comparison; and
   responsive to the storing of the result of the comparison where the result indicates a non-equality between the verification data item and said first data item, generating, at the processor, a fault message and causing software to operate upon the fault message to determine existence of a fault injection attack,
   wherein said compression operation (110) comprises multiplying (MDV) components ($s_i$, $s'_i$) of the result data item (s'), and
   wherein the verification step (E204) comprises verifying (E205, E205') that a zero component of the result data item (s') or input data item (s) corresponds to a zero component of respectively the input data item (s) or result data item (s').

* * * * *